United States Patent
Wildburg et al.

[11] Patent Number: 6,084,018
[45] Date of Patent: *Jul. 4, 2000

[54] PULVERULENT ADHESIVE

[75] Inventors: Gerald Wildburg, Ludwigshafen; Renate Wüstefeld, Schifferstadt; Heinrich Sack, Hassloch; Peter Fickeisen, Dirmstein, all of Germany

[73] Assignee: BASF Aktiengesellschaft, Ludwigshafen, Germany

[ * ] Notice: This patent issued on a continued prosecution application filed under 37 CFR 1.53(d), and is subject to the twenty year patent term provisions of 35 U.S.C. 154(a)(2).

[21] Appl. No.: 08/946,589

[22] Filed: Oct. 7, 1997

[51] Int. Cl.$^7$ .......................................... C08K 3/00
[52] U.S. Cl. ................................................ 524/424
[58] Field of Search .............................. 524/424

[56] References Cited

U.S. PATENT DOCUMENTS

| | | | |
|---|---|---|---|
| 3,907,737 | 9/1975 | Marx | 523/403 |
| 3,920,600 | 11/1975 | Ahramjian | 524/512 |
| 4,171,407 | 10/1979 | Elser | 428/500 |
| 4,419,481 | 12/1983 | Schwartz | 524/272 |
| 4,419,494 | 12/1983 | Puletti | 524/272 |
| 5,175,204 | 12/1992 | Orikasa | 524/504 |
| 5,290,832 | 3/1994 | Schwerzel | 524/56 |
| 5,331,042 | 7/1994 | Charmot | 524/556 |
| 5,356,956 | 10/1994 | Uemae | 523/201 |
| 5,358,998 | 10/1994 | Wendel | 524/734 |
| 5,470,912 | 11/1995 | Loar | 524/904 |
| 5,532,300 | 7/1996 | Koubek | 524/47 |
| 5,536,779 | 7/1996 | Wendel | 525/54.26 |
| 5,605,949 | 2/1997 | Anchor | 524/502 |
| 5,618,859 | 4/1997 | Maeyama | 523/201 |

FOREIGN PATENT DOCUMENTS

| | | |
|---|---|---|
| 078449 | 5/1983 | European Pat. Off. . |
| 522791 | 1/1993 | European Pat. Off. . |

*Primary Examiner*—Edward J. Cain
*Attorney, Agent, or Firm*—Keil & Weinkauf

[57] ABSTRACT

Pulverulent adhesives comprise a redispersible polymer powder based on a polymer which can be obtained in the presence of a protective colloid, and additionally comprise a filler, an alkaline additive and, if desired, an emulsifier and other additives.

15 Claims, No Drawings

PULVERULENT ADHESIVE

The present invention relates to pulverulent adhesives which comprise a redispersible polymer powder based on a polymer which is obtainable in the presence of a protective colloid, and to their use in aqueous adhesive formulations.

There is currently a great demand for pulverulent adhesives which can simply be stirred into water to form an easy-to-use adhesive formulation. Pulverulent adhesives of this kind are advantageously suitable for selling in the home improvement sector and are attractive on account of the small amount of packaging material involved, which often consists of paper and does not include plastic, the low transport costs owing to the lack of solvent and lack of water, and the ease of metering. Another advantage of powder is that problems which occur with regard to the preservation of aqueous formulations disappear, providing an overall improvement in keeping properties. Moreover, pulverulent adhesive formulations are generally odorless and frostproof (unlike aqueous formulations).

EP-A-0134451 describes a flowable redispersible dispersion powder which can be used inter alia for preparing adhesives but which is nevertheless unsuitable for preparing flooring adhesives. It is obtained by spray-drying an aqueous dispersion prepared by free-radical emulsion polymerization of one or more ethylenically unsaturated monomers in the presence of a protective colloid. The protective colloids used are water-soluble or water-swellable starches each containing not more than 30% by weight of amylose; degraded, cyanoalkylated, hydroxyalkylated and/or carboxymethylated starches; and water-soluble proteins.

The disclosure content of EP-B-0134449 is similar.

EP-A-0536597 describes aqueous polymer dispersions which are obtainable by free-radical polymerization of unsaturated monomers in the presence of a starch degradation product which in turn is obtainable by aqueous-phase hydrolysis, and it also describes processes for their preparation by emulsion polymerization, and their use as adhesives, binders for moldings based on finely divided organic and/or inorganic materials, binders for abrasive articles based on finely divided abrasive particles, binders for carpet backing coatings and paper coating slips, sizing products for fibers, and for producing coatings. Again, these dispersions and aqueous formulations of the powders described are unsuitable as flooring adhesives.

It is an object of the present invention to provide new pulverulent adhesives for use as flooring adhesives. The adhesive should in particular possess good wet sticking and dry touch properties. In addition, the adhesive powder should be readily dispersible in water.

We have found that this object can be achieved by using, in pulverulent adhesives, redispersible polymer powders based on a polymer which is obtainable in the presence of a protective colloid, in combination with an alkaline additive.

The invention therefore provides a pulverulent adhesive comprising:
 a) from 5.0 to 98.9% by weight of a redispersible polymer powder which is obtainable by free radical copolymerization of a mixture M comprising at least one ethylenically unsaturated monomer and at least one water-soluble comonomer which contains acid groups, to form a polymer P having a glass transition temperature of $\leq 20°$ C., in the presence of at least one protective colloid and, if desired, of further additives,
 b) from 1 to 94.9% by weight of at least one filler,
 c) from 0.1 to 10% by weight of at least one alkaline additive,
 d) from 0 to 10% by weight of at least one emulsifier, and
 e) from 0 to 30% by weight of optional further additives.

Component a)

Examples of suitable aqueous polymer dispersions are described in EP-A-0 536 597.

The monomer mixture M which is used to prepare the polymers P contains from 50 to 99.9% by weight, preferably from 60 to 99% by weight and, with particular preference, from 70 to 95% by weight of at least one free-radically polymerizable, ethylenically unsaturated monomer.

Suitable monomers are $C_2$–$C_6$ monoolefins, for example ethylene, vinyl aromatic compounds, for example styrene, α-methylstyrene, o-chlorostyrene or vinyltoluene, vinyl halides and vinylidene halides, for example vinyl chloride and vinylidene chloride, esters of vinyl alcohol with monocarboxylic acids of 1 to 20 carbons, for example vinyl formate, vinyl acetate, vinyl propionate, vinyl n-butyrate, vinyl laurate and vinyl stearate, esters of α,β-monoethylenically unsaturated mono- and dicarboxylic acids with alkanols of preferably 1 to 12 carbons, particularly preferably 1 to 8 carbons and, in particular, 1 to 4 carbons, for example esters of acrylic and/or methacrylic acid with methanol, ethanol, n-propanol, isopropanol, n-butanol, isobutanol or 2-ethylhexanol, dimethyl maleate or n-butyl maleate, ethylenically unsaturated nitriles, for example acrylonitrile and methacrylonitrile, and also non-aromatic hydrocarbons having 2 to 8 carbons and at least two olefinic double bonds, for example butadiene, isoprene and chloroprene.

The monomer mixture M additionally contains from 0.1 to 15% by weight, preferably from 1 to 10% by weight and, with particular preference, from 3 to 5% by weight of at least one α,β-monoethylenically unsaturated mono- and/or dicarboxylic acid. Examples of suitable acids are acrylic, methacrylic, maleic, fumaric, itaconic and crotonic acid and mixtures thereof.

The monomer mixture M may, if desired, additionally include from 0 to 40% by weight, preferably from 0 to 20% by weight and, with particular preference from 0.2 to 10% by weight of further monomers. Examples of suitable further monomers are N-alkylated acrylamides and methacrylamides, vinylsulfonic acids and their water-soluble salts, N-vinylpyrrolidone, and crosslinking monomers which in addition to their ethylenically unsaturated double bond comprise an epoxy, hydroxyl, N-methylol or carbonyl function or two nonconjugated ethylenically unsaturated double bonds. Examples of crosslinking monomers are hydroxyalkyl acrylates and methacrylates, N-hydroxyalkylated acrylamides and methacrylamides, for example N-methylolacrylamide and N-methylolmethacrylamide, and also monomers having at least two vinyl radicals, at least two vinylidene radicals or at least two alkenyl radicals. These include, for example, alkylene glycol diacrylates, alkylene glycol dimethacrylates, for example ethylene glycol diacrylate, 1,3-butylene glycol diacrylate, 1,4-butylene glycol diacrylate, propylene glycol diacrylate, divinylbenzene, vinyl methacrylate, vinyl acrylate, allyl methacrylate, allyl acrylate, diallyl maleate, diallyl fumarate and methylbisacrylamide.

In a preferred embodiment the mixture M comprises free-radically polymerizable, ethylenically unsaturated monomers from the four following classes in the preferred proportions specified above:

Class I

Esters of acrylic and/or methacrylic acid with alkanols of 1 to 12 carbons and/or styrene;

Class II

Styrene and/or conjugated dienes, preferably 1,3-butadiene;

Class III

Vinyl halides and/or vinylidene halides, preferably vinyl chloride and/or vinylidene chloride;

Class IV

Vinyl esters and/or aliphatic hydrocarbons having 1 or 2 double bonds and 2 to 8 carbons and/or esters of acrylic and/or methacrylic acid.

Particular preference is given to mixtures M comprising monomers of Class I.

In a particularly preferred embodiment the mixture M has ethylenically unsaturated monomers comprising styrene, ethyl acrylate, n-butyl acrylate, ethylhexyl acrylate and methyl methacrylate or mixtures thereof and as water-soluble comonomers containing acid groups comprises acrylic acid, methacrylic acid or mixtures thereof.

The glass transition temperature of the polymer P is preferably $\leq 0°$ C., particularly preferably $\leq -10°$ C., especially preferably $\leq -20°$ C., and especially $\leq -30°$ C. The glass transition temperature of the polymer can be determined by the method of differential thermoanalysis (DTA) or differential scanning calorimetry (DSC, as described in ASTM 3418/82).

The copolymerization of the above-described mixture M to a polymer P takes place in the presence of at least one protective colloid. Examples of suitable protective colloids are polyvinyl alcohols and partially hydrolyzed polyvinyl acetates, polyacrylates, polyvinylpyrrolidone, cellulose and cellulose derivatives, such as methylcellulose, hydroxyethylcellulose, carboxymethylcellulose, for example, starch and starch derivatives, for example cyanoalkyl ether starch, hydroxyalkyl ether starch, carboxymethylstarch, etc. An extensive description of protective colloids is given in Houben-Weyl, Methoden der Organischen Chemie, Volume XIV/1, Makromolekulare Stoffe [Macromolecular substances], Georg-Thieme-Verlag, Stuttgart, 1961, pp. 411–420.

In this context preference is given to the use as protective colloids of starch degradation products having a weight-average molecular weight of from 2500 to 25,000. The starch degradation products are obtainable from starch by hydrolysis in the aqueous phase or by thermal degradation (roast dextrins). Starch degradation products obtainable by hydrolysis in the aqueous phase are usually known as sugared starches, in contrast to the roast dextrins, and are commercially available (for example the C*PUR products 01906, 01908, 01910, 01912, 01915, 01921, 01924, 01932 or 01934 from Cerestar Deutschland GmbH, Krefeld).

Sugared starches of this type are chemically different from the roast dextrins in that, inter alia, there is essentially no possibility of recombination or branching in the case of a hydrolytic degradation in aqueous medium (usually suspensions or solutions), which is generally carried out at solids contents of from 10 to 30% by weight and, preferably, with acid or enzyme catalysis; this is manifested not least for example in different molecular weight distributions. Thus sugared starches having a bimodal molecular weight distribution have proven particularly advantageous in accordance with the invention.

The preparation of sugared starches is generally known and is described inter alia in Günther Tegge, Stärke und Stärkederivate, Behr's Verlag, Hamburg 1984, p. 173 and p. 220 ff, and in EP-A 441 197. The sugared starches to be used in accordance with the invention are preferably those whose weight-average molecular weight $M_w$ is in the range from 4000 to 16,000, particularly preferably in the range from 6500 to 13,000.

The sugared starches for use in accordance with the invention are normally completely soluble in water at room temperature, the solubility limit generally being above 50% by weight, which proves particularly advantageous for the preparation of the novel aqueous polymer dispersions.

Preference is given to sugared starches having a polydispersity U (defined as the ratio of weight-average molecular weight $M_w$ to number-average molecular weight $M_n$) in the range from 6 to 12. U is particularly preferably from 7 to 11 and in particular is from 8 to 10.

It is also advantageous if the proportion by weight of the sugared starches to be used in accordance with the invention that has a molecular weight of below 1000 is at least 10% by weight but not more than 70% by weight. This proportion by weight is with particular preference in the range from 20 to 40% by weight.

It is additionally advantageous to use sugared starches whose dextrose equivalent DE is from 5 to 40, preferably from 10 to 30 and, with particular preference, from 10 to 20. The DE value characterizes the reduction capacity relative to that of anhydrous dextrose, and is determined in accordance with DIN 10308 Edition 5.71 produced by the Standards Committee on Foodstuffs and Agricultural Products (cf. also Günther Tegge, Stärke und Stärkederivate, Behr's Verlag, Hamburg 1984, p. 305).

Moreover, aqueous polymer dispersions which are particularly suitable for the novel adhesives are obtained when sugared starches are used whose 40% strength by weight aqueous solutions have a dynamic viscosity $\eta^{40}$ [Pa.s], determined in accordance with DIN 53 019 at 25° C. and a shear gradient of 75 s$^{-1}$, of from 0.01 to 0.06, preferably from 0.015 to 0.04 and, with particular preference, from 0.02 to 0.035.

Unless noted otherwise, the molecular weight data for sugared starches are based on determinations by gel permeation chromatography under the following conditions:

Columns: 3 steel units measuring 7.5×600 mm, packed with TSK gel G 2000 PW; G 3000 PW and G 4000 PW. Pore size 5 μm Eluent: distilled water Temp.: RT (room temperature)

Detector: Differential fractometer (eg. ERC 7511)

Flow rate: 0.8 ml/min. Pump: (eg. ERC 64.00)

Injection vol.: 20 μl valve: (eg. VICI 6-way valve)

Evaluation: Bruker Chromstar GPC software

Calibration: Calibration was carried out in the low molecular mass range using glucose, raffinose, maltose and maltopentose. For the higher molecular mass range use is made of pullulan standards having a polydispersity of <1.2.

The starting starches for preparing the sugared starches to be used in accordance with the invention can in principle be any native starches, such as cereal starches (eg. corn, wheat, rice or millet), tuber and root starches (eg. potatoes, tapioca roots or arrowroot) or sago starches.

An essential advantage of the sugared starches to be used in accordance with the invention is that no chemical modification is required other than the partial hydrolysis of the starting starch for their preparation. However, if desired it is also possible to use starches which have been chemically modified, for example, by etherification or esterification. Such chemical modification may also have been carried out in advance on the starting starch prior to its degradation. Esterifications are possible using both inorganic and organic acids, or anhydrides or chlorides thereof. Phosphated and acetylated degraded starches are particularly suitable. The customary method of etherification is treatment with organic halogen compounds, epoxides or sulfates in aqueous alkaline solution. Particularly suitable ethers are alkyl ethers, hydroxyalkyl ethers, carboxyalkyl ethers and allyl ethers. Also suitable are reaction products with 2,3-epoxypropyltrimethyl-ammonium chloride. In the polymerization of the mixture M preference is given to sugared starches which have not been chemically modified. The mixture for preparing the redispersible polymer powder a) contains the starch degradation product in an amount of from 5 to 40% by weight, preferably from 10 to 30% by weight and, with particular preference, from 15 to 25% by weight, based on the weight of the polymerized monomers.

The sugared starches to be used in accordance with the invention can be employed either as sole dispersants or in a mixture with other surface-active substances as additives.

Suitable additional surface-active additives are the abovementioned protective colloids and emulsifiers which are commonly employed as dispersants in emulsion polymerization, and are described, for example, in Houben-Weyl [loc. cit.] pp. 411 to 420. Anionic, cationic and nonionic emulsifiers are suitable dispersants. Preference is given to the use of emulsifiers, whose relative molecular weights, unlike those of the protective colloids, are usually below 2000. If mixtures of surface-active substances are used then the individual components must be compatible with one another. Anionic and nonionic emulsifiers are preferably used as accompanying surface-active substances. Suitable emulsifiers are described in EP-A-0 536 597.

The mixture M for preparing the aqueous polymer dispersions is preferably polymerized by the method of free-radical aqueous emulsion polymerization in the presence of the sugared starches and in a customary manner. The emulsion polymerization temperature is generally from 30 to 95° C., preferably from 75 to 90° C. The polymerization medium may comprise either water alone or a mixture of water and water-miscible liquids, such as methanol. It is preferred to use water alone. The emulsion polymerization can be carried out either as a batch process or in the form of a feed process, including a stepwise or gradient procedure. Preference is given to the feed process, in which part of the polymerization batch is introduced as initial charge and heated to the polymerization temperature, and partially polymerized, and then the remainder of the polymerization batch is fed to the polymerization zone continuously, in steps or under a concentration gradient, usually via a plurality of spatially separate feed streams, of which one or more include the monomers in pure or emulsified form, while the polymerization is maintained. It is advantageous from a practical standpoint for the initial charge and/or the monomer feed to contain small amounts of emulsifiers, generally less than 0.5% by weight relative to the overall amount of monomers to be polymerized, in order to reduce the surface tension of the dispersion medium and thus to facilitate incorporation by stirring. The monomers are therefore frequently fed to the polymerization zone following emulsification with these auxiliary emulsifiers. Owing to the high solubility in water of the sugared starches that are to be used in accordance with the invention, the feed process can be configured in a particularly simple manner by initially introducing all of the sugared starch to be used, in dissolved form in an aqueous initial charge; prior gelling is unnecessary. The aqueous solution obtained from the partial hydrolysis of the starting starch can be used directly for the aqueous emulsion polymerization after hydrolysis has been stopped, for example, by neutralizing the catalytic acid and by cooling. Prior isolation of the sugared starch, for example by spray drying, is unnecessary.

Polymerization initiators which can be used are all those compounds which under the polymerization conditions break down into free radicals, examples being peroxides, hydroperoxides, hydrogen peroxide, persulfates, azo compounds and the redox catalysts. Preference is given to the use of water-soluble initiators. In some cases it is advantageous to use mixtures of different polymerization initiators, for example mixtures of hydrogen peroxide and sodium or potassium peroxodisulfate. Mixtures of hydrogen peroxide and sodium peroxodisulfate can be used in any desired proportion. Organic peroxides which are likewise suitable as initiators are described in EP-A-0 536 597. These polymerization initiators are employed in conventional amounts, for example in amounts of from 0.01 to 5% by weight, preferably from 0.1 to 2.0% by weight, based on the monomers that are to be polymerized.

Other initiators which are suitable are redox catalysts. The redox catalysts include at least one of the abovementioned per compounds as oxidizing component and, as reducing component, for example ascorbic acid, glucose, sorbose and the hydrogen sulfites, sulfites, thiosulfates, hyposulfites, pyrosulfites or sulfides of ammonium or of alkali metals, and also metal salts, such as iron(II) ions or silver ions, or sodium hydroxymethylsulfoxylate.

With the redox catalysts it is advantageous to use the sugared starches as reducing component. In general the amount of free-radical initiator systems employed, based on the overall amount of the monomers to be polymerized, is from 0.1 to 2% by weight. As initiators particular preference is given to the use of ammonium peroxodisulfates and/or alkali metal peroxodisulfates, on their own or as part of a combined system. Particular preference is given to the use of sodium peroxodisulfate.

The free-radical initiator system can either be included entirely in the initial charge to the polymerization vessel or introduced continuously or in stages at the rate at which it is consumed in the course of the free-radical aqueous emulsion polymerization. In each individual case this will depend, familiarly, on both the chemical nature of the initiator system and the polymerization temperature. Preferably, part is included in the initial charge and the remainder is fed to the polymerization zone at the rate at which it is consumed.

The free-radical aqueous emulsion polymerization is generally conducted under atmospheric pressure but can also be carried out under super- or subatmospheric pressure.

The monomer mixture M can if desired be polymerized in the presence of customary polymerization regulators, such as mercaptans, for example tert-dodecyl mercaptan. In this case the regulators are used in an amount of from 0.01 to 5% by weight, based on the overall amount of the mixture M.

The novel aqueous polymer dispersions are generally prepared with overall solids contents of from 15 to 70% by weight.

To prepare the redispersible polymer powders used as component a) in accordance with the invention, the aqueous polymer dispersions described above are dried. Drying can be done in a manner familiar to the skilled worker, for example by spray drying, roller drying or suction filter drying. Spray drying is preferred.

The dispersions can be spray-dried either in undiluted form or diluted with water, the solids content of the aqueous polymer dispersion for spray drying being preferably from 25 to 60% and, with particular preference from 40 to 50% (measured in accordance with DIN 53 189).

The pH of the dispersions for spray drying is preferably in the neutral or acid range, for example from 1 to 7, preferably from 2 to 6 and, with particular preference, from 3 to 6. If desired the pH of the dispersions can be adjusted, prior to spray drying, by means of acids or bases, for example alkali metal hydroxides, alkali metal carbonates, alkali metal phosphates, alkali metal acetates, ammonia, HCl, etc.. It has been found that the aqueous polymer dispersions cannot be spray-dried to give blocking-resistant powders if alkaline additives (component c)) are added to the aqueous dispersions before they are spray-dried.

An advantage is that the use of spray assistants for preparing component a) is unnecessary, especially if the content of abovementioned sugared starches in the aqueous polymer dispersions, based on the overall amount of the polymerized monomers, is above 10% by weight. However, if desired it is also possible to use known spray assistants. Examples of suitable spray assistants are polyvinyl alcohols, polyvinylpyrrolidones, ligninsulfonates, water-soluble condensation products of melamine and formaldehyde, condensation products of naphthalenesulfonic acid or phenolsulfonic acid and formaldehyde, polyacrylic acid, polyacrylamides, finely divided silicates or mixtures thereof.

Methods of spray-drying polymer dispersions are known to the skilled worker. In spray drying the general procedure is to spray an aqueous polymer dispersion in a stream of hot air using single-substance or multisubstance nozzles or via a rotating disc. The polymer powders are normally deposited using cyclones or filter separators. The sprayed aqueous polymer dispersion and the stream of hot air are preferably guided in parallel.

Component b)

The novel pulverulent adhesives comprise at least one filler b) in an amount of from 1 to 90% by weight. Examples of appropriate fillers are chalk, calcite, dolomite, quartz flour, titanium dioxide, aluminum silicate, talc, mica, kieselguhr, gypsum, magnesite, slate flour, barium sulfate, hard polymers or mixtures thereof. Preference is given to finely ground, surface-active or precipitated chalks having a mean particle diameter of from 2 to 50 $\mu$m, quartz flour having a mean particle diameter of from 3 to 50 $\mu$m, and the hard polymers described in EP-B-494 219.

Component b) is present in the pulverulent adhesive in an amount of preferably from 40 to 70% by weight.

Component c)

The novel pulverulent adhesives additionally include at least one alkaline additive c). Examples of suitable such additives are alkali metal hydroxides, for example NaOH, KOH, alkaline earth metal hydroxides, for example $Mg(OH)_2$, $Ca(OH)_2$, $Sr(OH)_2$, $Ba(OH)_2$, alkaline earth metal oxides, for example MgO and CaO, alkali metal carbonates, for example $Na_2CO_3$ and $K_2CO_3$, alkali metal bicarbonates, for example $NaHCO_3$ and $KHCO_3$ and silicates, especially waterglass.

It has surprisingly been found that component c) imparts a very good adhesive effect to the aqueous formulations prepared from the novel pulverulent adhesives by stirring with water. The pulverulent adhesives comprise component c) in an amount such that after stirring with water the pH of the formulations is >6, preferably >7 and with particular preference, >8. This amount is generally from 0.1 to 10% by weight, in particular from 1 to 6% by weight.

Component d)

The novel pulverulent adhesives can include up to 10% by weight of an emulsifier d), preferably in powder form. Suitable emulsifiers are the customary wetting agents and dispersants, examples being alkali metal salts of relatively long-chain fatty acids, alkyl sulfates, alkylsulfonates, alkylated arylsulfonates, alkoxylated, especially ethoxylated and propoxylated fatty alcohols, ligninsulfonates, phenolsulfonic acid-formaldehyde condensates, naphthalenesulfonic acid-formaldehyde condensates, etc.

Preference is given to the use of ethoxylated nonionic surfactants from the Emulan® range of BASF AG.

Component e)

Examples of suitable additional additives to the novel adhesives are starch and the abovementioned starch derivatives, cellulose and the abovementioned cellulose derivatives, and also the likewise above-described spray assistants. They can be present in an amount of up to 30% by weight. Other suitable additives are thickeners, for example homopolymers and copolymers based on polyacrylic acid salts and polyvinylpyrrolidone, for example the Collacral® grade from BASF, and also vinylpyrrolidone-vinylacetate copolymers, for example the Luviskol® grades from BASF. Thickeners which are also suitable are, for example, polyacrylates which are soluble in aqueous alkalis, for example the Latekoll® grades from BASF.

Examples of additionally suitable additives e) are preservatives, antifoams, dyes, pigments, pigment dispersants, for example the polyacrylate-based Pigmentverteiler N from BASF AG, etc. The novel adhesives may include one or more of the abovementioned additives in an overall amount of up to 30% by weight.

The novel pulverulent adhesives are prepared in a two-stage process in which in a first stage A) an aqueous polymer dispersion is dried, preferably by spray drying, as already described above in connection with component a).

The redispersible polymer powder a) obtained in the first process stage A) is subsequently mixed, in a second process stage B), with the above-described components b), c) and, if used, d) and/or e), using customary mixing equipment.

Owing to their content of redispersible polymer powder a) the resulting pulverulent adhesives are easy to stir up to form an aqueous adhesive formulation. Like component a) the adhesives are resistant to blocking, with no caking of the powders occurring even after prolonged storage—a particular advantage. A further advantage is that the blocking resistance is in general achieved without the addition of antiblocking agents. Surprisingly, blocking-resistant adhesive powders are only obtained when spray drying is conducted in the acidic to neutral pH range, preferably in the acidic pH range.

To prepare an aqueous adhesive formulation the novel pulverulent adhesive is mixed with water while stirring. The solids content of the aqueous adhesive formulations is from 40 to 99% by weight, preferably from 40 to 95% by weight and, with particular preference, from 50 to 90% by weight, based on the overall amount of the formulation.

Surprisingly, it is only pulverulent adhesives with alkaline additives c) which give aqueous adhesive formulations having a good adhesive effect.

Another surprise is that the novel aqueous adhesive formulations, when used as an adhesive for carpeting, form bonds which are stable to shampooing, despite the fact that the pulverulent adhesive on which they are based is readily redispersible and contains high amounts of water-soluble components such as degraded starches.

The aqueous adhesive formulations are particularly suitable as adhesives for bonding substrates made from plastic, wood, ceramic and metal and textiles made from woven or nonwoven fibers.

The aqueous formulations are particularly suitable as flooring adhesives for floor coverings, for example coverings of polyvinyl chloride (PVC), in single-layer or multi-layer coverings, foam coverings with a textile backing, for example of jute, for polyester nonwovens, rubber coverings, textile coverings with various backings, for example polyurethane foam, styrene-butadiene foam, textile secondary backing, and as adhesives for needlefelt floor coverings, polyolefin coverings or linoleum coverings on substrates such as wood, screed, concrete, ceramic tiles, metal substrates or the like.

The adhesive can be applied to the substrate in a customary manner, for example with a shearing doctor blade. After the customary ventilation, the floor covering is laid. The novel adhesive formulation exhibits good performance properties, such as wet sticking and dry touch properties.

The invention is illustrated using the following nonlimiting

EXAMPLES a) Preparing the Dispersions

Example 1

Novel

A mixture of 424.15 g of water and 140 g of maltodextrin C*PUR 01915 (starch degradation product from Cerestar Deutschland GmbH, obtainable by hydrolysis in the aqueous phase and having a bimodal molecular weight distribution, a weight average molecular weight $M^w$ of from 6680 to 8350, a polydispersity U ($M_w/M_n$) of 6.8 to 8.4, a molecular weight below 1000 of from 32.9 to 34.7% by weight, a dextrose equivalent DE of from 17 to 19 and a dynamic viscosity, in the form of a 40% strength aqueous solution, $\eta^{40}$ of 0.021 Pa.s) is heated to 85° C., and 10% by weight of feed stream 1 and 20% by weight of feed stream 2 are added. The batch is initially polymerized at 85° C. for 15 minutes, and then the metered addition of the remainders of feed streams 1 and 2 is commenced. They are added continuously over 2.5 hours (feed stream 1) and 3 hours (feed stream 2). Polymerization is then completed at 85° C. for 1 hour. The batch is subsequently subjected to chemical deodorization over a period of 60 minutes by adding a solution of 4.67 g of hydrogen peroxide (30% strength), 1.4 g of ascorbic acid and 0.35 g of iron(II) sulfate in 5 g of water. Finally the batch is adjusted to a pH of 4.5 using 10% strength sodium hydroxide solution.

| Feed stream 1: | 300 g of water |
| --- | --- |
|  | 23.33 g of dodecylbenzenesulfonate (15% strength in water) |
|  | 1.4 g of t-dodecyl mercaptan |
|  | 35 g of methacrylic acid |
|  | 665 g of n-butyl acrylate |
| Feed stream 2: | 100 g of water |
|  | 4.2 g of sodium peroxodisulfate |

Solids content of the aqueous polymer dispersion (measured in accordance with DIN 53 189): about 49.6% by weight

Example 2

Novel

A mixture of 464.5 g of water and 200 g of maltodextrin C*PUR 01915 is heated to 85° C., and 10% by weight of feed stream 1, 10% by weight of feed stream 2 and 20% by weight of feed stream 3 are added. Initial polymerization is carried out at 85° C. for 15 minutes, and then the metered addition of the remainders of feed streams 1, 2 and 3 is commenced. They are added continuously over 2.5 hours (feed streams 1 and 2) and 3 hours (feed stream 3). Polymerization is then completed at 85° C. for 1 hour. The batch is subsequently subjected to chemical deodorization over a period of 60 minutes by adding a solution of 6.67 g of hydrogen peroxide (30% strength), 2 g of ascorbic acid and 0.5 g of iron(II) sulfate in 10 g of water. Finally the batch is adjusted to a pH of 4.5 using 10% strength sodium hydroxide solution.

| Feed stream 1: | 430 g of water |
| --- | --- |
|  | 33.33 g of dodecylbenzenesulfonate (15% strength in water) |
|  | 2 g of t-dodecyl mercaptan |
|  | 950 g of n-butyl acrylate |
| Feed stream 2: | 140 g of water |
|  | 50 g of methacrylic acid |
| Feed stream 3: | 140 g of water |
|  | 6 g of sodium peroxodisulfate |

Solids content of the aqueous polymer dispersion (measured in accordance with DIN 53 189): about 49.7% by weight

Example 3

Novel

A mixture of 464.5 g of water and 200 g of maltodextrin C*PUR 01915 is heated to 85° C., and 10% by weight of feed stream 1, 10% by weight of feed stream 2 and 20% by weight of feed stream 3 are added. Initial polymerization is carried out at 85° C. for 15 minutes, and then the metered addition of the remainders of feed streams 1, 2 and 3 is commenced. They are added continuously over 2.5 hours (feed streams 1 and 2) and 3 hours (feed stream 3). Polymerization is then completed at 85° C. for 1 hour. The batch is subsequently subjected to chemical deodorization over a period of 60 minutes by adding a solution of 6.67 g of hydrogen peroxide (30% strength), 2 g of ascorbic acid and 0.5 g of iron(II) sulfate in 10 g of water. Finally the batch is adjusted to a pH of 4.5 using 10% strength sodium hydroxide solution.

| Feed stream 1: | 430 g of water |
| --- | --- |
|  | 33.33 g of dodecylbenzenesulfonate (15% strength in water) |
|  | 2 g of t-dodecyl mercaptan |
|  | 970 g of n-butyl acrylate |
| Feed stream 2: | 140 g of water |
|  | 30 g of methacrylic acid |
| Feed stream 3: | 140 g of water |
|  | 6 g of sodium peroxodisulfate |

Solids content of the aqueous polymer dispersion (measured in accordance with DIN 53 189): about 49.7% by weight

Example 4

Novel

A mixture of 464.5 g of water and 200 g of maltodextrin C*PUR 01915 is heated to 85° C., and 10% by weight of feed stream 1, 10% by weight of feed stream 2 and 20% by weight of feed stream 3 are added. Initial polymerization is carried out at 85° C. for 15 minutes, and then the metered addition of the remainders of feed streams 1, 2 and 3 is commenced. They are added continuously over 2.5 hours (feeds streams 1 and 2) and 3 hours (feed stream 3). Polymerization is then completed at 85° C. for 1 hour. The batch is subsequently subjected to chemical deodorization over a period of 60 minutes by adding a solution of 6.67 g of hydrogen peroxide (30% strength), 2 g of ascorbic acid and 0.5 g of iron(II) sulfate in 10 g of water. Finally the batch is adjusted to a pH of 4.5 using 10% strength sodium hydroxide solution.

| Feed stream 1: | 430 g of water |
| --- | --- |
| | 33.33 g of dodecylbenzenesulfonate |
| | (15% strength in water) |
| | 2 g of t-dodecyl mercaptan |
| | 990 g of n-butyl acrylate |
| Feed stream 2: | 140 g of water |
| | 10 g of methacrylic acid |
| Feed stream 3: | 140 g of water |
| | 6 g of sodium peroxodisulfate |

Solids content of the aqueous polymer dispersion (measured in accordance with DIN 53 189): about 49.7% by weight

Example 5

Novel

A mixture of 544.05 g of water and 220 g of maltodextrin C*PUR 01915 is heated to 85° C., and 5% by weight of feed stream 1 and 20% by weight of feed stream 2 are added. Initial polymerization is carried out at 85° C. for 15 minutes, and then the metered addition of the remainders of feed streams 1 and 2 is commenced. They are added continuously over 2.5 hours (feed stream 1) and 3 hours (feed stream 2). Polymerization is then completed at 85° C. for 1 hour. The batch is subsequently subjected to chemical deodorization over a period of 60 minutes by adding a solution of 7.33 g of hydrogen peroxide (30% strength), 2.2 g of ascorbic acid and 0.55 g of iron(II) sulfate in 10 g of water.

| Feed stream 1: | 500 g of water |
| --- | --- |
| | 36.67 g of dodecylbenzenesulfonate |
| | (15% strength in water) |
| | 3.3 g of t-dodecyl mercaptan |
| | 55 g of methacrylic acid |
| | 110 g of ethyl acrylate |
| | 935 g of n-butyl acrylate |
| Feed stream 2: | 250 g of water |
| | 6.6 g of sodium peroxodisulfate |

Solids content of the aqueous polymer dispersion (measured in accordance with DIN 53 189): about 50.0% by weight

Example 6

Novel

A mixture of 544.05 g of water and 220 g of maltodextrin C*PUR 01915 is heated to 85° C., and 5% by weight of feed stream 1 and 20% by weight of feed stream 2 are added. Initial polymerization is carried out at 85° C. for 15 minutes, and then the metered addition of the remainders of feed streams 1 and 2 is commenced. They are added continuously over 2.5 hours (feed stream 1) and 3 hours (feed stream 2). Polymerization is then completed at 85° C. for 1 hour. The batch is subsequently subjected to chemical deodorization over a period of 60 minutes by adding a solution of 7.33 g of hydrogen peroxide (30% strength), 2.2 g of ascorbic acid and 0.55 g of iron(II) sulfate in 10 g of water.

| Feed stream 1: | 500 g of water |
| --- | --- |
| | 36.67 g of dodecylbenzenesulfonate |
| | (15% strength in water) |
| | 3.3 g of t-dodecyl mercaptan |
| | 33 g of methacrylic acid |
| | 110 g of ethyl acrylate |
| | 957 g of n-butyl acrylate |
| Feed stream 2: | 250 g of water |
| | 6.6 g of sodium peroxodisulfate |

Solids content of the aqueous polymer dispersion (measured in accordance with DIN 53 189): about 49.8% by weight

Example 7

Novel

A mixture of 544.05 g of water and 220 g of maltodextrin C*PUR 01915 is heated to 85° C., and 5% by weight of feed stream 1 and 20% by weight of feed stream 2 are added. Initial polymerization is carried out at 85° C. for 15 minutes, and then the metered addition of the remainders of feed streams 1 and 2 is commenced. They are added continuously over 2.5 hours (feed stream 1) and 3 hours (feed stream 2). Polymerization is then completed at 85° C. for 1 hour. The batch is subsequently subjected to chemical deodorization over a period of 60 minutes by adding a solution of 7.33 g of hydrogen peroxide (30% strength), 2.2 g of ascorbic acid and 0.55 g of iron(II) sulfate in 10 g of water.

| Feed stream 1: | 500 g of water |
| --- | --- |
| | 36.67 g of dodecylbenzenesulfonate |
| | (15% strength in water) |
| | 3.3 g of t-dodecyl mercaptan |
| | 11 g of methacrylic acid |
| | 110 g of ethyl acrylate |
| | 979 g of n-butyl acrylate |
| Feed stream 2: | 250 g of water |
| | 6.6 g of sodium peroxodisulfate |

Solids content of the aqueous polymer dispersion (measured in accordance with DIN 53 189): about 50.0% by weight

Example 8

Novel

A mixture of 434.05 g of water and 110 g of maltodextrin C*PUR 01915 is heated to 85° C., and 10% by weight of feed stream 1 and 20% by weight of feed stream 2 are added. Initial polymerization is carried out at 85° C. for 15 minutes, and then the metered addition of the remainders of feed streams 1 and 2 is commenced. They are added continuously over 2.5 hours (feed stream 1) and 3 hours (feed stream 2). Polymerization is then completed at 85° C. for 1 hour. The batch is subsequently subjected to chemical deodorization over a period of 60 minutes by adding a solution of 7.33 g of hydrogen peroxide (30% strength), 2.2 g of ascorbic acid and 0.55 g of iron(II) sulfate in 10 g of water. Finally the batch is adjusted to a pH of 4.5 using 10% strength sodium hydroxide solution.

| Feed stream 1: | 500 g of water |
| --- | --- |
| | 36.67 g of sodium laurylsulfate |

-continued

|  | (15% strength in water) |
|---|---|
|  | 3.3 g of t-dodecyl mercaptan |
|  | 55 g of methacrylic acid |
|  | 1045 g of n-butyl acrylate |
| Feed stream 2: | 250 g of water |
|  | 6.6 g of sodium peroxodisulfate |

Solids content of the aqueous polymer dispersion (measured in accordance with DIN 53 189): about 50.6% by weight

Example 9

Novel

A mixture of 544.05 g of water and 220 g of maltodextrin C*PUR 01915 is heated to 85° C., and 5% by weight of feed stream 1 and 20% by weight of feed stream 2 are added. Initial polymerization is carried out at 85° C. for 15 minutes, and then the metered addition of the remainders of feed streams 1 and 2 is commenced. They are added continuously over 2.5 hours (feed stream 1) and 3 hours (feed stream 2). Polymerization is then completed at 85° C. for 1 hour. The batch is subsequently subjected to chemical deodorization over a period of 60 minutes by adding a solution of 7.33 g of hydrogen peroxide (30% strength) 2.2 g of ascorbic acid and 0.55 g of iron(II) sulfate in 10 g of water.

| Feed stream 1: | 500 g of water |
|---|---|
|  | 36.67 g of dodecylbenzenesulfonate |
|  | (15% strength in water) |
|  | 3.3 g of t-dodecyl mercaptan |
|  | 55 g of methacrylic acid |
|  | 110 g of ethylhexyl acrylate |
|  | 935 g of n-butyl acrylate |
| Feed stream 2: | 250 g of water |
|  | 6.6 g of sodium peroxodisulfate |

Solids content of the aqueous polymer dispersion (measured in accordance with DIN 53 189): about 49.9% by weight

Example 10

Novel

A mixture of 549.45 g of water and 220 g of maltodextrin C*PUR 01915 is heated to 85° C., and 5% by weight of feed stream 1 and 20% by weight of feed stream 2 are added. Initial polymerization is carried out at 85° C. for 15 minutes, and then the metered addition of the remainders of feed streams 1 and 2 is commenced. They are added continuously over 2.5 hours (feed stream 1) and 3 hours (feed stream 2). Polymerization is then completed at 85° C. for 1 hour. The batch is subsequently subjected to chemical deodorization over a period of 60 minutes by adding a solution of 7.33 g of hydrogen peroxide (30% strength), 2.2 g of ascorbic acid and 0.55 g of iron(II) sulfate in 10 g of water.

| Feed stream 1: | 350 g of water |
|---|---|
|  | 36.67 g of dodecylbenzenesulfonate |
|  | (15% strength in water) |
|  | 2.2 g of t-dodecyl mercaptan |
|  | 55 g of methacrylic acid |
|  | 110 g of ethyl acrylate |
|  | 935 g of n-butyl acrylate |

-continued

| Feed stream 2: | 150 g of water |
|---|---|
|  | 6.6 g of sodium peroxodisulfate |

Solids content of the aqueous polymer dispersion (measured in accordance with DIN 53 189): about 55.0% by weight

Example 11

Novel

A mixture of 446.53 of water and 220 g of maltodextrin C*PUR 01915 is heated to 85° C., and 5% by weight of feed stream 1 and 20% by weight of feed stream 2 are added. Initial polymerization is carried out at 85° C. for 15 minutes, and then the metered addition of the remainders of feed streams 1 and 2 is commenced. They are added continuously over 2.5 hours (feed stream 1) and 3 hours (feed stream 2). Polymerization is then completed at 85° C. for 1 hour. The batch is subsequently subjected to chemical deodorization over a period of 60 minutes by adding a solution of 7.33 g of hydrogen peroxide (30% strength), 2.2 g of ascorbic acid and 0.55 g of iron(II) sulfate in 10 g of water.

| Feed stream 1: | 300 g of water |
|---|---|
|  | 36.67 g of dodecylbenzenesulfonate |
|  | (15% strength in water) |
|  | 2.2 g of t-dodecyl mercaptan |
|  | 55 g of methacrylic acid |
|  | 110 g of ethyl acrylate |
|  | 935 g of n-butyl acrylate |
| Feed stream 2: | 100 g of water |
|  | 6.6 g of sodium peroxodisulfate |

Solids content of the aqueous polymer dispersion (measured in accordance with DIN 53 189): about 60.0% by weight

Example 12

Novel

A mixture of 227.66 g of water and 220 g of maltodextrin C*PUR 01915 is heated to 85° C., and 5% by weight of feed stream 1 and 20% by weight of feed stream 2 are added. Initial polymerization is carried out at 85° C. for 15 minutes, and then the metered addition of the remainders of feed streams 1 and 2 is commenced. They are added continuously over 2.5 hours (feed stream 1) and 3 hours (feed stream 2). Polymerization is then completed at 85° C. for 1 hour. The batch is subsequently subjected to chemical deodorization over a period of 60 minutes by adding a solution of 7.33 g of hydrogen peroxide (30% strength), 2.2 g of ascorbic acid and 0.55 g of iron(II) sulfate in 10 g of water.

| Feed stream 1: | 200 g of water |
|---|---|
|  | 36.67 g of dodecylbenzenesulfonate |
|  | (15% strength in water) |
|  | 2.2 g of t-dodecyl mercaptan |
|  | 55 g of methacrylic acid |
|  | 110 g of ethyl acrylate |
|  | 935 g of n-butyl acrylate |
| Feed stream 2: | 100 g of water |
|  | 6.6 g of sodium peroxodisulfate |

Solids content of the aqueous polymer dispersion (measured in accordance with DIN 53 189): about 70.0% by weight

Comparison Example 1

Without the Addition of a Starch Degradation Product 297.28 g of water are heated to 85° C., and 10% by weight of feed stream 1 and 20% by weight of feed stream 2 are added. Initial polymerization is carried out at 85° C. for 15 minutes, and then the metered addition of the remainders of feed streams 1 and 2 is commenced. They are added continuously over 2.5 hours (feed stream 1) and 3 hours (feed stream 2). Polymerization is then completed at 85° C. for 1 hour. The batch is subsequently subjected to chemical deodorization over a period of 60 minutes by adding a solution of 7.33 g of hydrogen peroxide (30% strength), 2.2 g of ascorbic acid and 0.55 g of iron(II) sulfate in 10 g of water. Finally, the batch is adjusted to a pH of 4.5 using 10% strength sodium hydroxide solution.

| Feed stream 1: | 500 g of water |
| --- | --- |
| | 73.33 g of dodecylbenzenesulfonate (15% strength in water) |
| | 2.2 g of t-dodecyl mercaptan |
| | 55 g of methacrylic acid |
| | 1045 g of n-butyl acrylate |
| Feed stream 2: | 250 g of water |
| | 6.6 g of sodium peroxodisulfate |

Solids content of the aqueous polymer dispersion (measured in accordance with DIN 53 189): about 50.0% by weight Dispersion Powder 1 (Novel)
  Spray drying of the undiluted aqueous polymer dispersion from Example 1.
Dispersion Powder 2 (Novel)
  Spray drying of Example 2.
Dispersion Powder 3 (Novel)
  Spray drying of Example 3.
Dispersion Powder 4 (Novel)
  Spray drying of Example 4.
Dispersion Powder 5 (Novel)
  Spray drying of Example 5.
Dispersion Powder 6 (Novel)
  Spray drying of Example 6
Dispersion Powder 7 (Novel)
  Spray drying of Example 7.
Dispersion Powder 8 (Novel)
  Spray drying of Example 8.
Dispersion Powder 9 (Novel)
  Spray drying of Example 9.
Dispersion Powder 10 (Novel)
  Spray drying of the aqueous polymer dispersion from Example 10 diluted with water to a solids content of 40%.
Dispersion Powder 11 (Novel)
  Spray drying of the aqueous polymer dispersion from Example 11 diluted with water to a solids content of 40%.
Dispersion Powder 12 (Novel)
  Spray drying of the aqueous polymer dispersion from Example 12 diluted with water to a solids content of 40%.
Comparison Dispersion Powder 1
  A solution of maltodextrin 01915 (140 g) in water (140 g) is added to 1.7 of the aqueous polymer dispersion from Comparison Example 1. Spry drying takes place as described above.

Comparison Dispersion Powder 2

The aqueous polymer dispersion from the novel Example 1 is adjusted to a pH of 8 using 10% strength sodium hydroxide solution. Spray drying takes place as described above.

TABLE 1

Composition of the dispersions from the Examples/Comparison Example

| Dispersion | n-BA | EA | EHA | MMA | MAA | t-DMC | Aryls. | NaLS | NaPS | C* PUR 01915 |
| --- | --- | --- | --- | --- | --- | --- | --- | --- | --- | --- |
| Example 1 | 95.00 | — | — | — | 5.00 | 0.20 | 0.50 | — | 0.60 | 20.00 |
| Example 2 | 95.00 | — | — | — | 5.00 | 0.20 | 0.50 | — | 0.60 | 20.00 |
| Example 3 | 97.00 | — | — | — | 3.00 | 0.20 | 0.50 | — | 0.60 | 20.00 |
| Example 4 | 99.00 | — | — | — | 1.00 | 0.20 | 0.50 | — | 0.60 | 20.00 |
| Example 5 | 85.00 | 10.00 | — | — | 5.00 | 0.30 | 0.50 | — | 0.60 | 20.00 |
| Example 6 | 87.00 | 10.00 | — | — | 3.00 | 0.30 | 0.50 | — | 0.60 | 20.00 |
| Example 7 | 89.00 | 10.00 | — | — | 1.00 | 0.30 | 0.50 | — | 0.60 | 20.00 |
| Example 8 | 95.00 | — | — | — | 5.00 | 0.30 | — | 0.50 | 0.60 | 10.00 |
| Example 9 | 85.00 | — | 10.00 | — | 5.00 | 0.20 | 0.50 | — | 0.60 | 20.00 |
| Example 10 | 85.00 | — | 10.00 | — | 5.00 | 0.20 | 0.50 | — | 0.60 | 20.00 |
| Example 11 | 85.00 | — | 10.00 | — | 5.00 | 0.20 | 0.50 | — | 0.60 | 20.00 |
| Example 12 | 85.00 | — | 10.00 | — | 5.00 | 0.20 | 0.50 | — | 0.60 | 20.00 |
| Comparison Example 1 | 95.00 | — | — | — | 5.00 | 0.20 | 1.00 | — | 0.60 | — |

Figures in percent by weight based on the overall monomer amount
Abbreviations:
Aryls   dodecylbenzenesulfonate
n-BA   n-butyl acrylate
t-DMC   t-dodecyl mercaptan
EA   ethyl acrylate
EHA   2-ethylhexyl acrylate
MAA   methacrylic acid
MMA   methyl methacrylate
NaPS   sodium peroxodisulfate
NaLS   sodium lauryl sulfate b) Preparing the Dispersion Powders by Spray Drying Spray drying is carried out in a unit operating by the cocurrent procedure. Atomization is through a dual-substance nozzle, with powder deposition (the recovery of the target product) taking place by cyclone deposition. As an alternative drying procedure, atomization can be carried out with a centrifugal atomizer (disk atomization) and powder separation using filter elements.

TABLE 2

| Dispersion from Ex. No. | Dispersion powder No. | Spray drying | | | | |
|---|---|---|---|---|---|---|
| | | Entry temperature (° C.) | Exit temperature (° C.) | Appearance | Color | Progress of drying |
| 1 | 1 | 150 | 80 | satisfactory | white | satisfactory |
| 2 | 2 | 150 | 84 | satisfactory | white | satisfactory |
| 3 | 3 | 150 | 84 | satisfactory | white | satisfactory |
| 4 | 4 | 150 | 84 | satisfactory | white | satisfactory |
| 5 | 5 | 150 | 83 | satisfactory | white | satisfactory |
| 6 | 6 | 150 | 84 | satisfactory | white | satisfactory |
| 7 | 7 | 150 | 84 | satisfactory | white | satisfactory |
| 8 | 8 | 150 | 85 | satisfactory | white | satisfactory |
| 9 | 9 | 150 | 85 | satisfactory | white | satisfactory |
| 10 | 10 | 150 | 85 | satisfactory | white | satisfactory |
| 11 | 11 | 150 | 85 | satisfactory | white | satisfactory |
| 12 | 12 | 150 | 85 | satisfactory | white | satisfactory |
| Comp. 1 | Comp. 1 | 150 | 83 | blocked | yellowish | discontinued: major formation of wall deposits |
| 1 at pH of 8 | Comp. 2 | 150 | 85 | caked | yellowish | discontinued |

From Table 2 it can be seen that the dispersion powders 1 to 12 can be prepared without problems under the chosen spray-drying conditions. The experiment with the comparison dispersion powder 1 demonstrates that spray drying cannot be carried out adequately if the protective colloid C* c) Performance Properties

The dispersion powders 1 to 12 are formulated into pulverulent adhesives using novel additives, with vigorous shaking by hand, and are then mixed using a stirrer to form an aqueous adhesive formulation. Table 3 reproduces the compositions of the adhesive formulations.

TABLE 3

Adhesive formulation

| Dispersion powder | A | B | C | D | E | F | G | H | J | K | L | M | N | O | P |
|---|---|---|---|---|---|---|---|---|---|---|---|---|---|---|---|
| 1 | 60 | 60 | 60 | 60 | | | | | | | | | | | |
| 2 | | | | | 60 | | | | | | | | | | |
| 3 | | | | | | 60 | | | | | | | | | |
| 4 | | | | | | | 60 | | | | | | | | |
| 5 | | | | | | | | 60 | | | | | | | |
| 6 | | | | | | | | | 60 | | | | | | |
| 7 | | | | | | | | | | 60 | | | | | |
| 8 | | | | | | | | | | | 60 | | | | |
| 9 | | | | | | | | | | | | 50 | | | |
| 10 | | | | | | | | | | | | | 50 | | |
| 11 | | | | | | | | | | | | | | 50 | |
| 12 | | | | | | | | | | | | | | | 50 |
| Emulan ® OG[1] | 1.5 | 1.5 | 1.5 | 1.5 | 1 | 1 | 1 | 1.5 | 1.5 | 1.5 | 1.5 | 1.5 | 1.5 | 1.5 | 1.5 |
| Antifoam[2] | 1 | 1 | 1 | 1 | 1.5 | 1.5 | 1.5 | 1 | 1 | 1 | 1 | 1 | 1 | 1 | 1 |
| Na carbonate | 0 | 0.5 | 1.5 | 2.5 | 1.5 | 1.5 | 1.5 | 1.5 | 1.5 | 1.5 | 1.5 | 1.5 | 1.5 | 1.5 | 1.5 |
| Ulmer-Weiβ XM[3] | 40 | 40 | 40 | 40 | 40 | 40 | 40 | 40 | 40 | 40 | 40 | 50 | 50 | 50 | 50 |
| Water | 40 | 40 | 40 | 40 | 40 | 40 | 40 | 40 | 40 | 40 | 40 | 50 | 50 | 50 | 50 |
| pH | 4.5 | 7.7 | 9.5 | 8.9 | 8.5 | 9 | 9.6 | 8.2 | 8.7 | 9.3 | 8.4 | 9.3 | 9.3 | 9.3 | 9.3 |

Figures in parts by weight
[1] ethoxylated nonionic surfactant from BASF
[2] pulverulent antifoam (ethoxylated fatty alcohol)
[3] chalk product from Merckle GmbH, Blaubeuren PUR 01915 is mixed in after the preparation of the dispersion. It is necessary to polymerize the dispersion in the presence of the maltodextrin molecules, as was done in novel Examples 1 to 12. The attempt to spray-dry the dispersion from Example 1 after raising the pH to 8 is unsuccessful, as comparison dispersion powder 2 demonstrates. It is necessary to conduct spray drying of starch-containing dispersions in the acidic pH range.

Wet Sticking (Table 4)

The adhesive is applied in the direction of peel to a panel of fiber-reinforced cement (Eterflex® 2000) (20×50 cm) using a 2 mm doctor blade. The amount applied is from 350 g/m² to 450 g/m². After a ventilation period of 10 min, needlefelt floor coverings (in the form of strips) are laid in the bed of adhesive and are pressed on using a 2.5 kg roller which is rolled backward and forward 3 times. After the periods indicated, the coverings are peeled off using a peeling device (peel rate 725 mm/min), during which the increase in the peel resistance is recorded and is stated in N/5 cm. The comparison adhesive used was a commercial, dispersion-based carpet adhesive.

sticking properties, the dry touch properties also show the adhesive formulation O to be in the same order of magnitude as the commercial adhesives.

TABLE 4

Wet sticking properties

Adhesive formulation from Table 3

| Ventilation time | A | B | C | D | E | F | G | H | J | K | L | M | N | O | P | Commercial adhesive 1 |
|---|---|---|---|---|---|---|---|---|---|---|---|---|---|---|---|---|
| 10 min. | no | 1 | 1 | 2 | 1 | 0 | 0 | 4 | 1 | 0 | 5 | 6 | 7 | 5 | 4 | 1 |
| 20 min. | adhesive | 2 | 3 | 3 | 4 | 1 | 2 | 6 | 3 | 0 | 12 | 13 | 17 | 15 | 14 | 11 |
| 30 min. | force | 3 | 6 | 8 | 13 | 2 | 2 | 13 | 4 | 1 | 25 | 25 | 26 | 23 | 21 | 22 |
| 40 min. |  | 7 | 21 | 22 | 23 | 12 | 8 | 27 | 10 | 2 | 35 | 33 | 31 | 25 | 29 | 25 |
| pH | 4.5 | 7.7 | 8.5 | 8.9 | 8.5 | 9 | 9.6 | 8.2 | 8.7 | 9.3 | 8.4 | 9.3 | 9.3 | 9.3 | 9.3 |  |

Adhesive formulations A to D exemplify the effect of pH on the wet sticking properties. It was found that the dispersion powder spray-dried in the acidic pH range only develops an adhesive force in the adhesive formulation when the pH is raised into the alkaline range by adding sodium carbonate (B, C and D). In the acidic pH range (A) almost no adhesive force is found.

Adhesive formulations E, F and G and also H, J and K exemplify the need for comonomers containing acid groups to be present in the polymer in order for an adhesive force to be built up. Where the dispersion powders contain, say, no methacrylic acid, no adhesive force buildup is found (values not shown). Particularly good adhesive values are reached when 5% by weight of methacrylic acid is incorporated (adhesive formulation E, H and L to P).

Comparison with a commercial flooring adhesive ( . . . , based on a dispersion and not on a dispersion powder) shows that in general the novel dispersion powders in an adhesive formulation have wet sticking properties which are in the same order of magnitude as those of a customary commercial dispersion-based adhesive.

Dry Touch Properties

Both substrates and adhesive are conditioned for 24 h under standard conditions (23° C./50% rel. humidity). The adhesive is applied using a standardized shearing doctor blade (1 mm) in the longitudinal direction onto the covering Eterflex® 2000 (500×200×7.5 mm). A polyvinyl chloride floor covering (Pegulan® B 1 test covering (250×50 mm)) is laid, following the ventilation times given in Table 5, in the adhesive bed and is pressed on using a 2.5 kg roller by rolling it backward and forward 3 times. Testing is carried out in the peel device by peeling at a rate of 725 mm/minute, immediately after bonding. For evaluation, the mean of two test specimens is formed, and stated in N/5 cm. The results are reproduced in Table 5.

TABLE 5

Dry touch properties: Eternit/PVC

| Ventilation time | Adhesive formulation | |
|---|---|---|
|  | Formulation O | Commercial adhesive 1 |
| 10 min. | 0 | 2 |
| 20 min. | 10 | 21 |
| 30 min. | 14 | 20 |
| 40 min. | 10 | 15 |

Table 5 exemplifies the comparison of a novel adhesive formulation O with commercial adhesives. As with the wet Shampooing Stability (DIN 16860)

From 350 g/m² to 450 g/m² of adhesive formulation are applied to a panel of fiber-reinforced cement (Eterflex® 2000/(20×50 cm) using a 2 mm doctor blade, and after a ventilation period of 10 minutes needlefelt strips are laid in the bed of adhesive and pressed on. After the bonded carpet assembly has been stored at room temperature for 14 days, the Eterflex/needlefelt bond assembly is shampooed by vigorous rubbing using a domestic sponge soaked in a surfactant solution (K8). After a residence time of 10 minutes, it is cleaned with clear water and dried off using a dry cloth. The bond strength is then tested on the peeling device. The measurements are stated in N/5 cm and are reproduced in Table 6.

TABLE 6

Shampooing stability

| Adhesive | Bond strength | Bond strength after shampooing | Bond strength after drying for 1 d | Bond strength after drying for 7 d | Bond strength after 3 weeks at RT |
|---|---|---|---|---|---|
| Dispersion powder 9 | >100 | 75 | 95 | >100 | >100 |

Table 6 shows that an adhesive formulation based on the novel dispersion powders has good shampooing stability, and after prolonged drying reattains the adhesive values prior to shampooing. This good shampooing stability is surprising, since the use of starch molecules in the required proportion by weight might be expected to lead to increased absorption of water and thus to poor shampooing stability.

We claim:

1. A pulverulent adhesive for flooring adhesive, carpeting adhesive or tile adhesive comprising:

a) from 5.0 to 98% by weight of a redispersible polymer powder, b) from 1 to 94.9% by weight of at least one filler, c) from 0.1 to 10% by weight of at least one alkaline additive, and d) from 0 to 10% by weight of at least one emulsifier, said redispersible polymer powder having been prepared by a process consisting essentially of polymerizing by free radical aqueous emulsion polymerization a mixture M comprising at least one ethylenically unsaturated monomer selected from the group consisting of ester of α,β-monoethylenically unsaturated mono or dicarboxylic acids with alkanols of 1 to 8 carbon atoms, vinyl aromatic compounds ethylene, butadiene, and mixtures thereof and at least one water-soluble comonomer which contains acid groups selected from the group consisting of acrylic, methacrylic, maleic, fumatic, itaconic crotonic acid and or mixtures thereof, in the presence of at least one starch degradation product having a weight average molecular weight of from 2500 to 25,000, as protective colloid to form an aqueous dispersion of a polymer which has a glass transition temperature of $\leq -10°$ C. and drying said aqueous polymer dispersion at a pH of 1 to 7 wherein the composition M comprises by weight, 50 to 99.9% of the ethylenically unsaturated monomer, 0.1 to 15% of water-soluble monomer, and 5–40% of the starch degradation product.

2. An adhesive as claimed in claim 1 comprising:

from 15 to 70% by weight, of the redispersible polymer powder a) and from 30 to 85% by weight of the filler b).

3. An adhesive as claimed in claim 1 where the $\alpha,\beta$-monoethylenically unsaturated mono- and/or dicarboxylic acid of the mixture M is acrylic acid, methacrylic acid or a mixture thereof.

4. An adhesive as claimed in claim 1 where the glass transition temperature of the polymer $P \leq -20°$ C.

5. An adhesive as claimed in claim 1 where the filler b) is selected from the group consisting of chalk, calcite, dolomite, quartz flour, titanium dioxide, aluminum silicate, talc, mica, kieselguhr, gypsum, magnesite, slate flour, barium sulfate, hard polymers and mixtures thereof.

6. An adhesive as claimed in claim 1 where the alkaline additive c) is selected from the group consisting of alkali metal hydroxides, alkaline earth metal hydroxides, alkaline earth metal oxides, alkali metal carbonates, alkali metal bicarbonates, silicates and mixtures thereof.

7. An aqueous adhesive formulation obtained by mixing at least one pulverulent adhesive as claimed in claim 1 with water.

8. An aqueous adhesive formulation as claimed in claim 7 with a pH of more than 6.

9. An adhesive as in claim 1 wherein the ethylenically unsaturated monomer comprises from 70 to 95% by weight and the water soluble comonomer comprises from 3 to 5% by weight.

10. An adhesive as in claim 1 wherein the starch degradation product comprises from 15 to 25% by weight.

11. An adhesive as in claim 1 wherein the glass transition temperature of the polymer $P \leq -20°$ C.

12. An adhesive as in claim 11 wherein the glass transition temperature of the polymer $P \leq -30°$ C.

13. An aqueous adhesive formulation as claimed in claim 8 with a pH of more than 6.

14. An aqueous adhesive formulation as claimed in claim 8 with a pH of more than 7.

15. An aqueous adhesive formulation as claimed in claim 14 with a pH of more than 8.

* * * * *

UNITED STATES PATENT AND TRADEMARK OFFICE
CERTIFICATE OF CORRECTION

PATENT NO. : 6,084,018
DATED : July 4, 2000
INVENTOR(S) : WILDBURG et al.

It is certified that error appears in the above-identified patent and that said Letters Patent is hereby corrected as shown below:

Col. 7, line 46 bridging line 46:

"$Mg(OH_2,$"

should be together on one line as: --$Mg(OH)_2,$--.

Col. 7, line 58, "amountis" should be --amount is--.

Col. 9, line 12 bridging line 13, "the following nonlim-iting" should be --the following nonlimiting examples".

Col. 9, line 25, "$M^w$" should be --$M_w$--.

Col. 14, line 13, "446.53 of water" should be --446.53 g of water--.

Col. 16, line 30, "1.7" should be --1.7 l--.

Col. 17/18, in Table 3, the pH value under "C" should be --8.5--.

Signed and Sealed this

Thirteenth Day of February, 2001

*Attest:*

NICHOLAS P. GODICI

*Attesting Officer*   Acting Director of the United States Patent and Trademark Office

UNITED STATES PATENT AND TRADEMARK OFFICE
CERTIFICATE OF CORRECTION

PATENT NO. : 6,084,018
DATED : July 4, 2000
INVENTOR(S) : WILDBURG et al.

It is certified that error appears in the above-identified patent and that said Letters Patent is hereby corrected as shown below:

Insert the following priority information:

--[30] Foreign Application Priority Data
Oct. 24, 1996 [DE] Germany ..................... 196 44 309 --

Signed and Sealed this

First Day of May, 2001

Attest:

NICHOLAS P. GODICI

Attesting Officer        Acting Director of the United States Patent and Trademark Office

UNITED STATES PATENT AND TRADEMARK OFFICE
CERTIFICATE OF CORRECTION

PATENT NO. : 6,084,018
DATED : July 4, 2000
INVENTOR(S) : Wildburg et al.

It is certified that error appears in the above-identified patent and that said Letters Patent is hereby corrected as shown below:

Insert the following priority information:

-- [30] Foreign Application Priority Data
   Oct. 24, 1996 [DE] Germany ................. 196 44 309.1 --.

Signed and Sealed this

Fourteenth Day of August, 2001

*Attest:*

NICHOLAS P. GODICI
*Attesting Officer*    *Acting Director of the United States Patent and Trademark Office*